(12) United States Patent
Singh (10) Patent No.: US 9,252,964 B2
(45) Date of Patent: Feb. 2, 2016

(54) DYNAMICALLY OPTIMIZED MANY TREE MULTICAST NETWORKS

(71) Applicant: CISCO TECHNOLOGY, INC., San Jose, CA (US)

(72) Inventor: Gagandeep Singh, New Delhi (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 143 days.

(21) Appl. No.: 14/092,682

(22) Filed: Nov. 27, 2013

(65) Prior Publication Data

US 2015/0146575 A1    May 28, 2015

(51) Int. Cl.
  *H04L 12/18*    (2006.01)
  *H04L 12/753*   (2013.01)
  *H04L 12/24*    (2006.01)
  *H04L 12/761*   (2013.01)

(52) U.S. Cl.
  CPC .......... *H04L 12/185* (2013.01); *H04L 41/0659* (2013.01); *H04L 45/16* (2013.01); *H04L 45/48* (2013.01)

(58) Field of Classification Search
  None
  See application file for complete search history.

(56) References Cited

U.S. PATENT DOCUMENTS

| 8,385,245 | B2  |   | 2/2013  | Burton et al. |         |
|-----------|-----|---|---------|---------------|---------|
| 2005/0201278 | A1 |   | 9/2005  | Banerjee et al. |       |
| 2007/0140107 | A1 | * | 6/2007  | Eckert et al. | 370/216 |
| 2008/0089245 | A1 |   | 4/2008  | Reichstein et al. |     |
| 2013/0272133 | A1 | * | 10/2013 | Yalagandula et al. | 370/238 |
| 2013/0336318 | A1 | * | 12/2013 | Kannan et al. | 370/390 |
| 2014/0016457 | A1 | * | 1/2014  | Enyedi et al. | 370/225 |

FOREIGN PATENT DOCUMENTS

WO    WO2015/080824    6/2015

OTHER PUBLICATIONS

PCT Jan. 7, 2015 International Search Report and Written Opinion from International Application Serial No. PCTUS2014/062693.
Pendarakis, Dimitrios, et al., "ALMI: An Application Level Multicast Infrastructure," USENIX, Jan. 5, 2002, XP061011447, 12 pages.

* cited by examiner

*Primary Examiner* — Diane Lo
(74) *Attorney, Agent, or Firm* — Patent Capital Group (57) ABSTRACT

In one embodiment, an example method is provided and includes sending link data from a node to a control entity; querying the control entity for a Many Tree assignment; receiving the Many Tree assignment from the control entity at the node; and joining a Many Tree based on the Many Tree assignment.

20 Claims, 7 Drawing Sheets

DYNAMICALLY OPTIMIZED MANY TREE MULTICAST NETWORKS

TECHNICAL FIELD

This disclosure relates in general to communications networks and, more particularly, to a method, a system, and an apparatus for providing Many Tree multicast networks in a communications system.

BACKGROUND

Communication networks generally function to move data from a source to a destination through a network of nodes interconnected by point-to-point links. The links may be bi-directional communication paths between two connected nodes within the network. Data may be transmitted in packets and routed through intermediate nodes (e.g., routers and switches from a source to a destination in the network). Routing protocols implemented within the nodes of a network allow one or more components, devices, or modules of the node to correctly direct data to its appropriate next destination. The transmission of data from a source to a destination in a network may be part of a point-to-point communication in which the source is directing the transmission at a single destination. The transmission of data to a source may also be part of a multicast transmission in which the source is directing the transmission to multiple destinations.

Multicast traffic in a multicast transmission is implemented so that data packets are routed from one source through a network to multiple destinations using resources and bandwidth as efficiently as possible. This is done by transmitting single packets meant for multiple destinations on a single path through the network as far as possible and only replicating the packet for transmission on multiple paths to the multiple destinations when the network topology requires use of the multiple paths to reach the multiple destinations. As the multicast packets traverse the network, the network nodes replicate the packet only when necessary to pass it on to the multiple destinations.

In today's data center network topologies, which are mainly equal cost multipath (ECMP), multicast transmission is being used more and more, for more and more applications which include transmission of data for financial services, multimedia videos, etc. In ECMP, routing each path is assumed to incur the same cost as far as latency, congestion, etc., as compared to any other path when being assigned. Multicast networks commonly use a Shared Tree or a Shortest Path Tree multicast routing scheme. In Shortest Path multicast routing the multicast distribution tree is a source tree with its root at the source and branches forming a spanning tree through the network to the destination receivers. The shortest path routing scheme tree uses the shortest path through the network. In Shared Tree multicast routing, unlike shortest path, a shared tree uses a single common root placed at some chosen point in the network. This common shared root is called a Rendezvous Point (RP).

Shortest path and shared tree multicast transmission may be effected adversely because the data path assignments in those schemes are unpredictable from the viewpoint of data traffic congestion, latency, or other similar effects on a network. This unpredictability may cause, for example, congestion on one link of a transmission using shortest path or shared tree multicast transmission while another link in the network might be completely un-utilized.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method and apparatus for implementing a dynamic Many Tree multicast network is disclosed in accordance with example embodiments. In one example embodiment, at least one node of a network collects data related to communication links in the network. The collected link data is sent by the at least one node to at least one control entity. The collected link data is used to generate a data analysis set. When a selected node of the network is part of a tree of multicast transmission, the selected node may query a control entity for a multicast Many Tree assignment. The control entity may determine a multicast Many Tree assignment based on the data analysis set and return the Many Tree assignment to the selected node. The selected node then may join a multicast tree based on the assignment of the Many Tree.

In a further example embodiment, at least one node of a network collects data related to communication links in the network. The collected link data is sent to by the at least one node to at least one control entity. The collected link data is used to generate a data analysis set. When a selected node becomes part of a multicast tree, the selected node creates a source, group route ((S,G) route) with reverse path forwarding (RPF) for a multicast network with an appropriate *,G outgoing interface forwarding link (OIFL). While part of the multicast tree, the selected node may query a control entity for a multicast Many Tree assignment. The control entity may determine a new RPF assignment for a Many Tree assignment based on the data analysis set and send the new RPF assignment to the selected node. The selected node may receive the new RPF Many Tree assignment and, if the RPF is different from the current RPF of the multicast tree, may modify its RPF table appropriately and join the new Many Tree for multicast in the network. A Many Tree according to the embodiments means a multicast tree that may routed be through plurality of possible paths in a network with the choice of possible paths being larger than a choice based only on particular shortest path (SPT) or shared tree path (RPT) considerations. The choice of paths for a Many Tree may be based on link data and not based only on shortest path (SPT) or shared tree (RPT) path criteria. The link data sent by the at least one network node and used by the control entity to generate the data analysis set for Many Tree assignment may be any data that is used in determining the new Many Tree and may include, for example, parameters such as link health, link load, congestion on the link, drop counts, buffer utilization at network nodes, average latency and resource utilization, and data used to check if any parameters have exceeded user configured thresholds on any of the network nodes.

In a further example embodiment a secure connection may implemented between the control entity and the at least one node and a heartbeat mechanism may be maintained on top of the secure connections. If there is a heartbeat failure between a network node and a client on the server the data collected from this network node may be taken out of the data-analysis set and not used in determining Many Tree assignments. On the node side, on a heartbeat failure with the control entity the node may fall back to use of the legacy SPT and RPT path only models.

Example Embodiments

The method and apparatus will now be described by use of exemplary embodiments. The example embodiments are presented in this disclosure for illustrative purposes, and not intended to be restrictive or limiting on the scope of the disclosure or the claims presented herein.

The example embodiments address problems with static multicast reverse past selection by providing linking of multicast path assignment to various parameters such as, for example, buffer utilization, statistics on packets dropped, link health, average latency, etc. Since the tasks of processing and data mining are central processing unit (CPU) intensive the embodiments may use out-of-band storage and computation, for example, by offloading processing to a multipath server implemented by a Hadoop Cluster, or a similar computational function/storage technology for data analysis to choose a best link. Software defined networks (SDN), data analytics, and improved operations and management (OAM) capabilities may be combined to implement the embodiments. Although the embodiments presented in this disclosure are directed toward datacenter-based networks, the concepts of the embodiments may be applied to any industry including, for example, enterprise, cloud, power grid, etc.

In example embodiments, a selected node in a network may initially become part of either a shortest path (SPT) multicast network or a shared tree (RPT) multicast network and query the server for the new RPF assignment Many Tree assignment and switch to the new multicast Many Tree from either the shared tree or shortest path. In another alternative of the example embodiments, a node receiving a Many Tree path assignment may wait until the next network join-prune time for joining network nodes to or removing network nodes from multicast trees before switching to the new Many Tree. In addition, in the example embodiments, the selected network node may be a last hop node or router in a tree or the selected network node may be an intermediate node that a downstream node is asking to select a reverse path forwarding for source group (S,G) entry. The example embodiments also may apply to reverse path forwarding (RP) triggering an S,G join towards a first hop router.

Figure 1A:
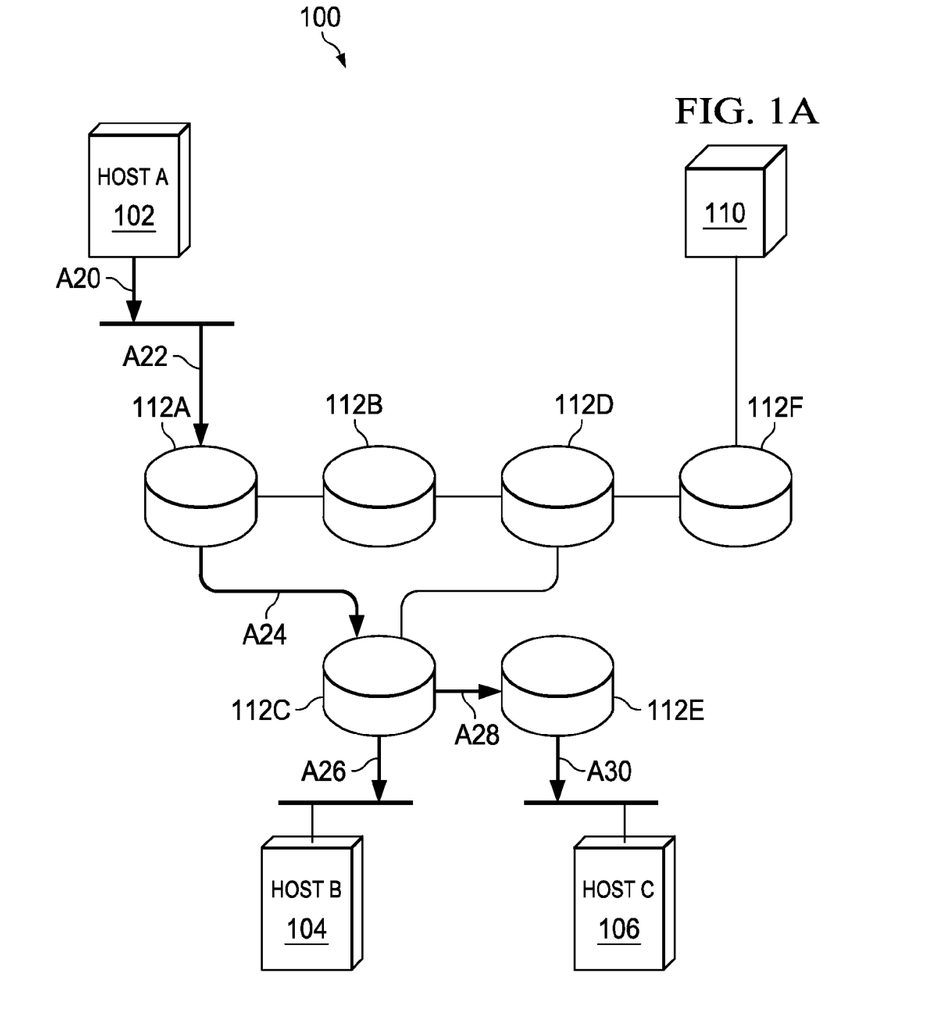
FIGS. 1A and 1B are a simplified block diagram illustrating a network into which an example embodiment of the disclosure may be implemented.
Figure 1B:
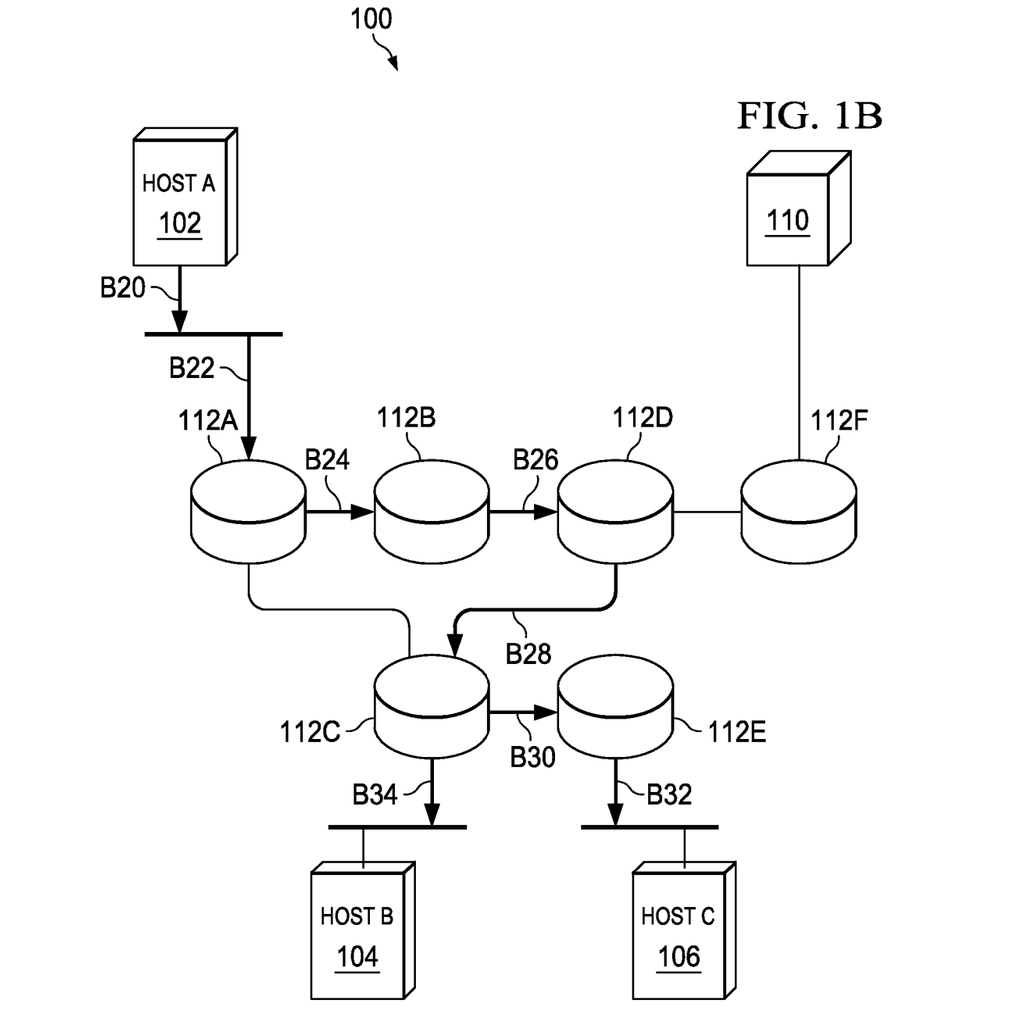

Referring now to FIGS. 1A and 1B, therein are simplified block diagrams illustrating a network 100 that has received a Many Tree assignment in accordance with an example embodiment of the disclosure. FIG. 1A shows an embodiment of a network 100 in which a selected node, such as node 112c may initially become part of a shortest path (SPT) multicast network and query a control entity for a new RPF Many Tree assignment and switch to a new multicast Many Tree from the shortest path multicast tree. Network 100 includes nodes 112a-112f, control entity 110, host A 102, host B 104, and host c 106. Nodes 112a-112f may be implemented as any kind of network node, routing or switching equipment that provides the appropriate routing/switching functions for the example embodiments.

Host A 102, host B 104 and host C 106 may be implemented as any type of device or computer terminal equipment that communicates data over a network. Control entity 110 may be implemented as any configuration and number of processing equipment that provides the processing and communication functions described herein implemented in the example embodiments. In one example embodiment, for example, control entity 110 may be implemented in one or more a Hadoop Clusters or multipath servers. FIG. 1A illustrates the example in which Host A 102 is shown initially sending multicast packets through SPT multicast network to Host B 104 over the shortest path defined by links A20, A22, A24 and A26, and to Host C 106 over the shortest path defined by links A20, A22, A24, A28 and A30.

Referring now to FIG. 1B, therein is illustrated an example in which node 112c has been assigned a new Many Tree multicast. The result is that Host A is sending multicast packets through a Many Tree multicast network to Host B 104 over the Many Tree path defined by links B20, B22, B24, B26, B28 and B34, and to Host C 106 over the Many Tree path defined by links B20, B22, B24, B26, B28, B30 and B32. The multicast Many Tree illustrates a possible example reassignment from a multicast shortest path as shown in FIG. 1A to a Many Tree network as shown in FIG. 1B that is determined according to the embodiments of the disclosure. The actual Many Tree assigned would be determined based on processing of various data at various times and the actual resultant Many Tree assignment would vary depending on the network environment. In example embodiments, it is also possible that the determination of a new Many Tree results in a Many Tree that is the same as the current shortest path tree and no need to change trees.

Figure 2A:
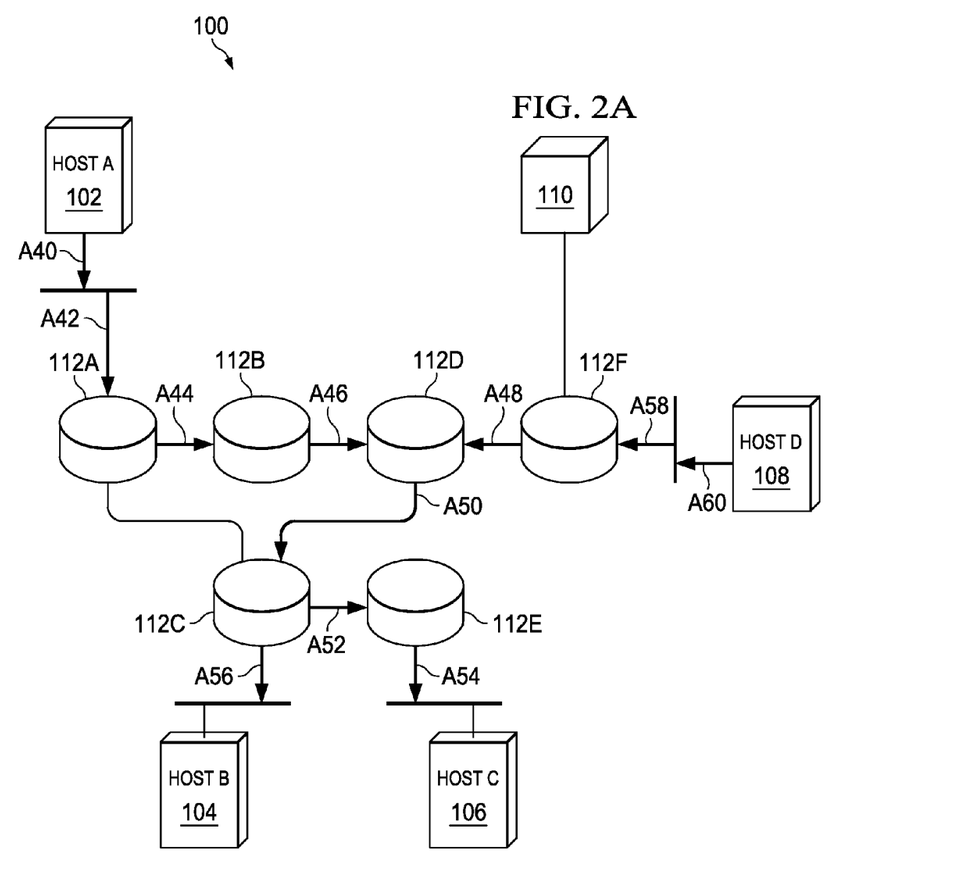
FIGS. 2A and 2B are a simplified block diagram illustrating the network of FIG. 1 in accordance with another example embodiment of the disclosure.
Figure 2B:
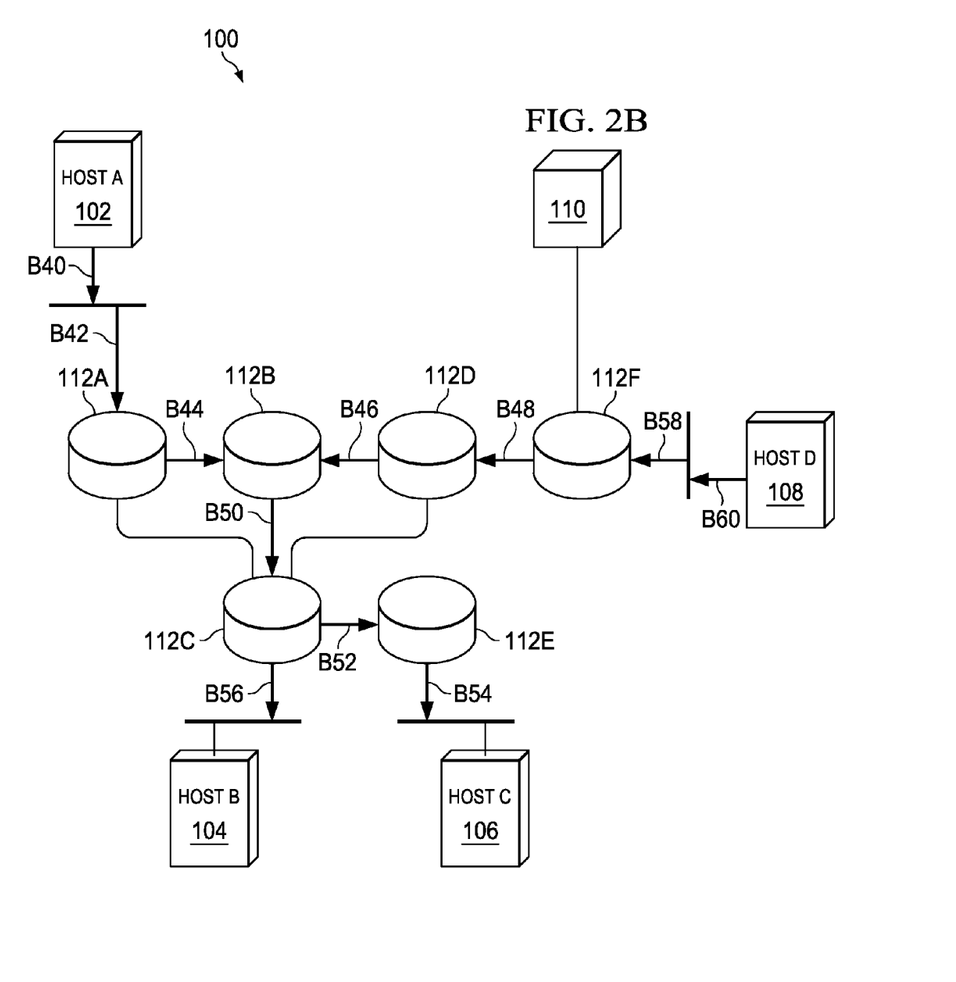

Referring now to FIGS. 2A and 2B therein are simplified block diagrams illustrating network 100 in accordance with another example embodiment of the disclosure. FIGS. 2A and 2B show an embodiment of network 100 in which selected node 112c in the network may initially become part of a shared tree (RPT) multicast network and query a control entity for a new RPF Many Tree assignment and switch to a new multicast Many Tree from the shared tree. FIG. 2A illustrates the example in which Host A 102 is shown initially sending multicast packets through shared tree RPT multicast network to Host B 104 and Host C 106 over RPT path having a shared root node 122D. Host A 104 is shown using links A40, A42, A44, A46, A50 and A56 to send packets to Host B 104 and links A60, A58, A48, A50, A52 and A54 to send packets to Host C 106. Host D 108 is shown using links A60, A58, A48, A50 and A56 to send packets to Host A and links A60, A58, A48, A50, A52 and A54 to send packets to Host C 106.

Referring now to FIG. 2B, therein is illustrated an example in which node 112c has been assigned a new Many Tree multicast. The result is that Host A is sending multicast packets to Host B through a Many Tree multicast network shown by links B40, B42, B44, B50 and B56 and sending multicast packets to Host C over Many Tree multicast network shown by links B40, B42, B44, B50, B52 and B55. Host D is shown sending on Many Tree multicast network using links B60, B58, B48, B46, B50 and B56 to send packets to Host A and links B60, B58, B48, B46, B50, B52 and B54 to send packets to Host C 106. The multicast Many Tree illustrates a possible example reassignment from a RPT multicast path to a Many Tree network that is determined according to the embodiments of the disclosure. The actual Many Tree assigned would be determined based on processing of various data at various times and the actual resultant Many Tree assignment would vary depending on the network environment. In example embodiments, it is also possible that the determination of a new Many Tree results in a Many Tree that is the same as the RPT and no need to change trees.

Figure 3:
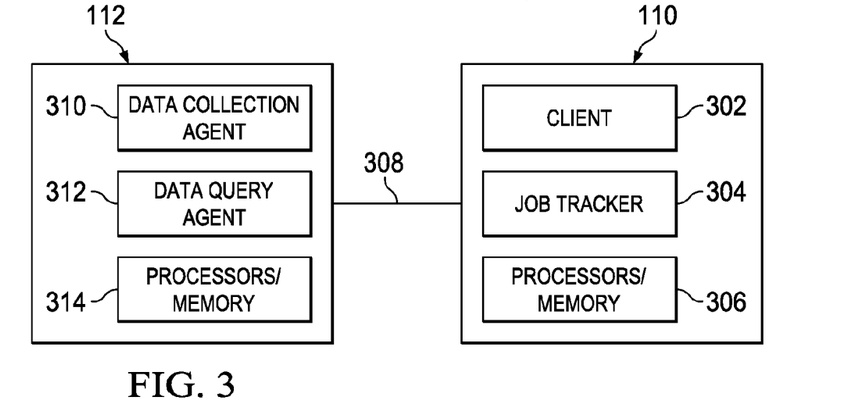
FIG. 3 is a simplified block diagram illustrating functions that may be associated with a node and a server in accordance with an example embodiment of the disclosure.

Referring now to FIG. 3, therein is illustrated a simplified functional block diagram of a network node 112 and a control entity 110 according to an example embodiment of the disclosure. Node 112 may represent any of the nodes 112a-112e in FIGS. 1 and 2 from a functional perspective. Control entity 110 may represent control entity 110 in each of FIGS. 1 and 2 from a functional perspective. Node 112 includes data collection agent 310, data query agent 312, and processors/memory 314. Control entity 110 includes client 302, job tracker 304, and processors/memory 306. In example embodiments, each data center network node 212 that may be involved in reverse path selection for multicast traffic may open a secure connection 308 to control entity 110 that include the client 302 and job tracker 304, to export data in generic format and to query data. In an example implementation client 302 may be implemented, for example, in a Hadoop cluster. When the secure connection 308 is established and active, each network node 112 exports the nodes snapshot view of data to the client 302. Each network node exports data in generic format to the client 302 for example, the network node 112 can use xml interface provided by NX-OS to upload output of various CLIs.

The data collection agent 310 running on each of the network nodes collects the data and exports the data to client 302. Each network node 110 may upload a snapshot of relevant data at the expiration of a predetermined periodic time-interval, where the time-interval may be configurable by user. In example embodiments, to keep the number of updates to a minimum and minimize the bandwidth used, the uploaded data may only contain the modified data and not the whole data set, thus, allowing rapid updates to be sent to client machines. The data loaded into the client 302 at control entity 112 may be analyzed by using a map-reduce algorithm, to select best path Many Tree based on the processed data when the data query agent 312 of a network node 112 asks for a new Many Tree assignment.

Existing infrastructure for data collection in the network such as, for example, embedded event manager (EEM), Net-Flow™ or Sflow™ may be modified to interact with the data collection 310 client to export and upload data to client 302. In example embodiments, the data collection agent 310 of each node is paired with a data query agent 312. The function of data query agent 312 is to query the client 302 for Many Tree information/instructions, or assignments, for a possible new Many Tree. The Many Tree information/instructions may inform the node 112 as to which a multicast flow it should join based on the network state, operator configured policies, or other considerations as determined by the map-reduce algorithm.

The functions shown in node 110 and control entity 112 of FIG. 3 may be controlled by processors/memory 314 of node 112 and processors/memory 306 of control entity 110. The processors may be microprocessors or microcontrollers, for example, and execute instructions included in firmware/software stored in each associated memory. The firmware/software stored in memory of processor/memory 314 may be executed to cause the processor to perform the operations described herein for the functions of a network node, such as node 112, and, the firmware/software stored in memory of processor/memory 314 may be executed to cause the processor to perform the operations described herein for the functions of the control entity 110.

The memory of each of processor/memory 314 and 306 may comprise read only memory (ROM), random access memory (RAM), magnetic disk storage media devices, optical storage media devices, flash memory devices, electrical, optical, or other physical/tangible memory storage devices. In general, the memory may comprise one or more tangible (non-transitory) computer readable storage media (e.g., a memory device) encoded with software comprising computer executable code or instructions and when the software is executed by the processor it is operable to perform the operations described herein.

Figure 4:
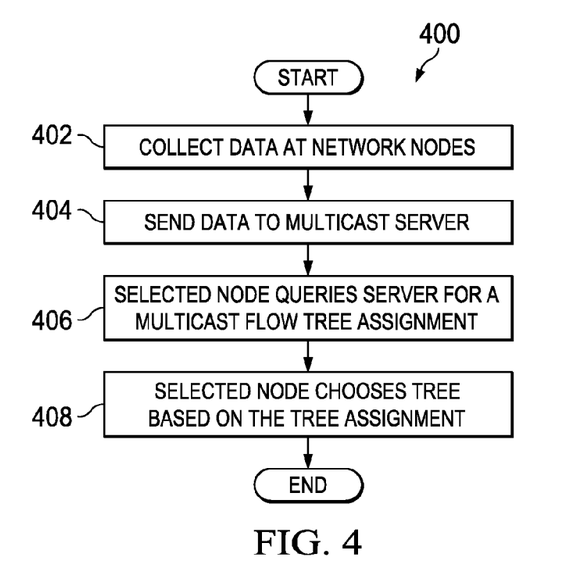
FIG. 4 is a simplified flow diagram illustrating operations that may be associated with a Many Tree multicast process in accordance with an example embodiment of the disclosure.

Referring now to FIG. 4, FIG. 4 is a simplified flow diagram 400 illustrating operations that may be associated with a Many Tree multicast process in a node in accordance with an example embodiment of the disclosure. While the process of FIG. 400 illustrates the process within one node, in example embodiments the process may be performed similarly in each of a plurality of nodes of a network with each node communicating with a control entity, such as control entity 110 of FIG. 1 collecting data from a plurality of nodes, such as nodes 112a-112f of FIG. 1. The process begins at 402 where the data collection agent 310 of a selected node of the nodes 112a-112f begins the process of data collection. At 404, the data collection agent 310 of the node sends the collected data through the network to control entity 110 over secure connection 308. At 406, the data query agent 312 of the node queries the control entity for a multicast flow tree assignment. At 408, after receiving the multicast tree assignment the node configures itself to choose the tree assignment, which may be a Many Tree assignment according to the embodiments. As described previously, while this process is described from the perspective of a selected node, any of the network nodes may function as the selected node and each node in a network may send data independently or in coordination with the other nodes, depending on network configuration. Additionally, a node may communicate with more than one control entity that is providing the functions of the embodiments.

Figure 7:
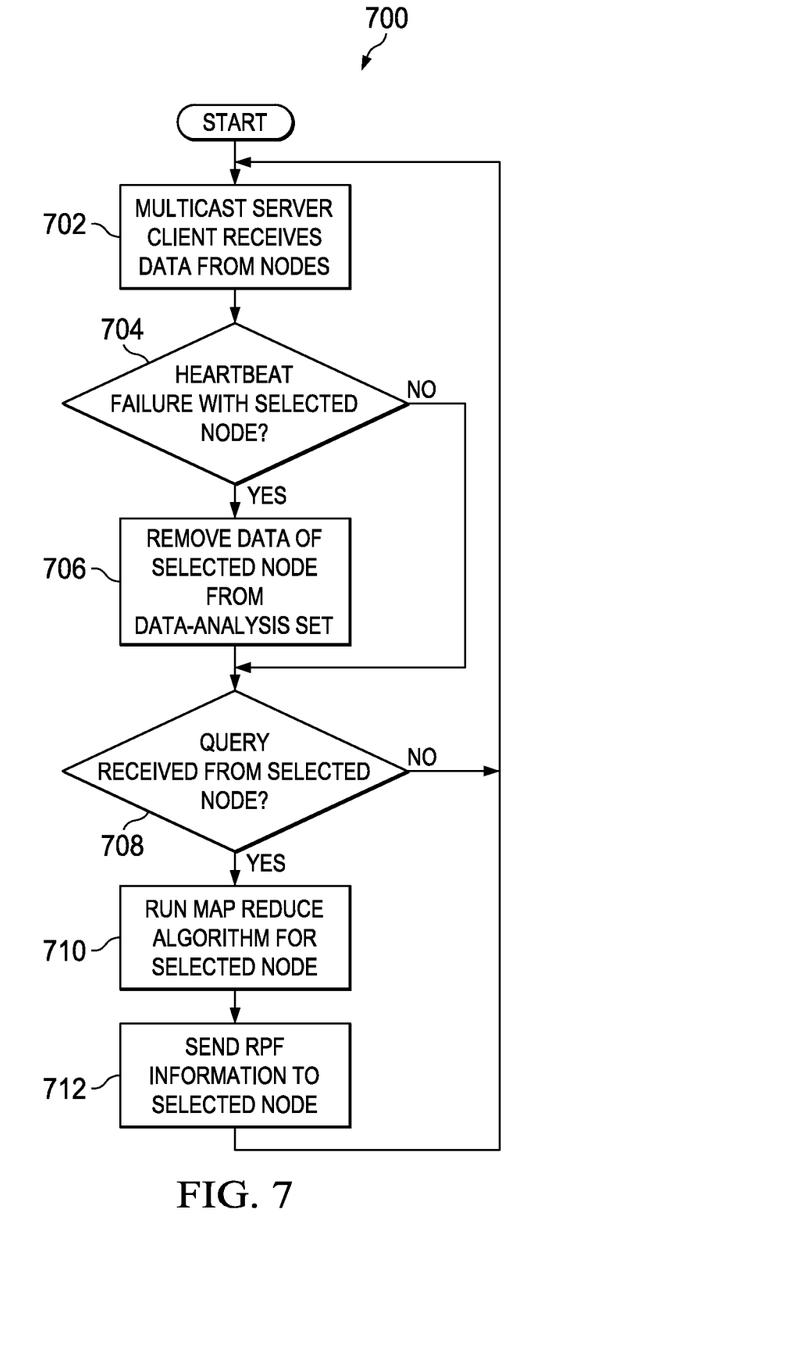

The example embodiments may also include implementations of features for managing the collection of data received from the plurality of nodes in a network at the control entity. Referring now to FIG. 7, therein is a flow diagram 700 illustrating operations that may be associated with a Many Tree multicast process in a network server in accordance with an example embodiment of the disclosure. The process begins at 702 where the control entity 110 is receiving data from the data collection agent 310 of each of the network nodes 112a-112f. As the data is received at control entity 110, client 302 monitors, at 704, for a heartbeat signal failure to determine if a failure associated with a selected node of the network nodes 112a-112f has occurred.

In addition, control entity 110 monitors, at 708, for a query from the selected node for a new RPT information/assignment list. If no heartbeat failure occurs at 704 before the control entity 110 receives a query from the selected node for new RPT information/assignment list at 708, the process moves to 710. After receiving the query, at 710, control entity 110 runs a map reduce algorithm in job tracker 304 for the selected node of nodes 112a-112b to determine the new RPF information. At 712, the control entity 110 then sends the new RPF information/assignment to the selected node. The process continues again at 702 as control entity 110 continues to receive data from data collection agent 310 of each of the network nodes 112a-112f. The control entity 110 continues to monitor for heartbeat failures or queries from the nodes 112a-112f and performs the process accordingly.

In an example embodiment, an RPT bound may be implemented to allow a node to join a Many Tree. In this embodiment an S,G route is created with RPF the same as the shared tree on the last hop router and with an appropriate *,G OIFL (outgoing interface list) for a node. A query is then generated to the control entity requesting the control entity to send the querying node an appropriate RPF that has been selected based on analyzing the data set in the control entity. Once the node receives the response for the query it may change the RPF to the interface suggested by the query and then we join the new Many Tree. If the new tree suggested by the query is same as the shared path RPF, the node does not change anything. To keep disruption and use of overhead at a minimum the node may determine, according to network configuration, to join the new RPF only at the next PIM join-prune refresh timer.

Figure 5:
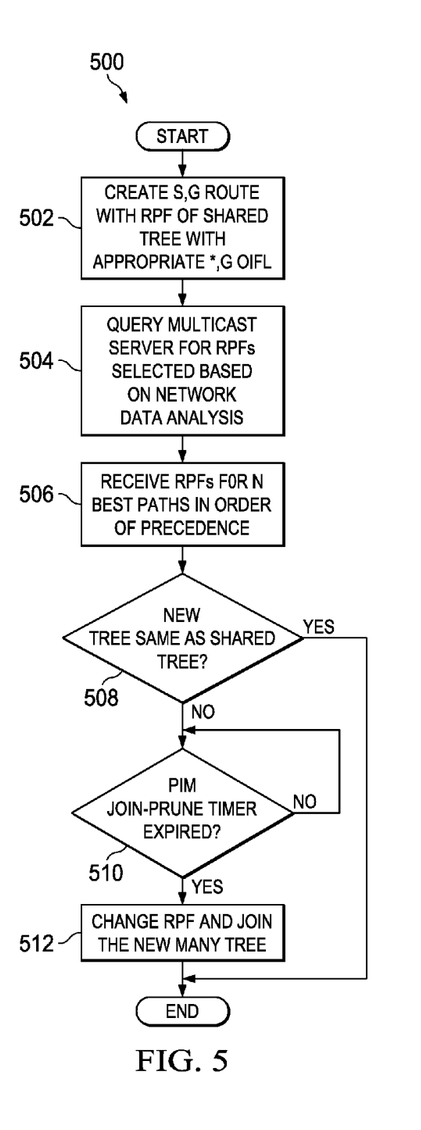
FIG. 5 is a simplified flow diagram illustrating operations that may be associated with a RPT bound Many Tree multicast process in a network node in accordance with an example embodiment of the disclosure.

Referring now to FIG. 5, therein is a simplified flow diagram 500 illustrating operations that may be associated with a RPT bound Many Tree multicast process in a network node in accordance with an example embodiment of the disclosure. This process may be performed by node of FIG. 1, such as a node of nodes 112a-112f. At 502, the node creates an S,G route with RPF of a shared tree with an appropriate *,G OIFL. Next, at 504, the node sends a query to control entity 110 for RPFs selected by the job tracker function 304 based on network analysis of client 302. At 506, the node receives an information/assignment list of RPFs of the N best paths in order of precedence or priority based on predetermined parameters used for the selection. At 508, the node determines if the new tree defined by the received RPFs is the same as the current shared tree. If the best new tree defined by the received RPFs is the same as the current shared tree the process ends and the node keeps the RPF configuration the same. If the best new tree defined by the received RPFs is not the same as the shared tree the process moves to 510. At 510, the node monitors the PIM join-prune timer for expiration. When the PIM join-prune timer is determined to have expired the process moves to 512 and the node changes its RPF from the RPF of the shared tree to the RPF of the Many Tree and joins the new Many Tree.

In another example embodiment a SPT bound may be implemented to allow a node to join a Many Tree. In this embodiment an S,G route is created with RPF the same as shortest path tree on the last hop router with an appropriate *,G OIFL (outgoing interface list) for a node. A query is then generated to the Hadoop cluster to query to send the node querying an appropriate RPF selected based on analyzing the data set in the control entity. Once the node receives the response for the query it may change the RPF to the interface suggested by the query and then join the new Many Tree. If the new tree suggested by the query is the same as the shortest path RPF, the node does not change anything.

Figure 6:
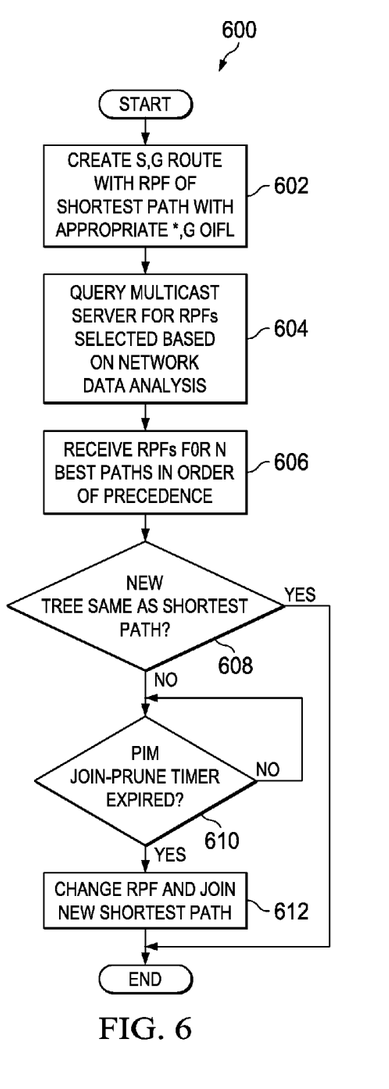
FIG. 6 is a simplified flow diagram illustrating operations that may be associated with a SPT bound Many Tree multicast process in a network node in accordance with another example embodiment of the disclosure; and, FIG. 7 is a simplified flow diagram illustrating operations that may be associated with a Many Tree multicast process in a network server in accordance with an example embodiment of the disclosure.

Referring now to FIG. 6, therein is a simplified flow diagram 600 illustrating operations that may be associated with a SPT bound Many Tree multicast process in a network node in accordance with an example embodiment of the disclosure. This process may be performed by a node in FIG. 2, such as a one of nodes 112a-112f. At 602 the node creates an S,G route with RPF of a shortest path tree with an appropriate *,G OIFL. Next, at 604, the node sends a query to control entity 110 for RPFs selected by the job tracker function 304 based on network analysis of client 302. At 606, the node receives a list of RPFs of the N best paths in order of precedence or priority based on predetermined parameters used for the selection. At 608, the node determines if the new tree defined by the received RPFs is the same as the current shortest path. If the best new tree defined by the received RPFs is the same as the current shortest path the process ends and the node keeps the RPF configuration the same. If the best new tree defined by the received RPFs is not the same as the shortest path the process moves to 610. At 610, the node monitors the PIM join-prune timer for expiration. When the PIM join-prune timer expires, the process moves to 512 and the node changes its RPF from the RPF of the shortest path to the RPF of the new Many Tree and joins the new Many Tree.

In example embodiments of FIGS. 5 and 6, once the best Many Tree is selected for a node, PIM join-prune will take care of joining the new Many Tree and pruning the old RPT or SPT whichever may be the case. The query agent 312 of each node may also be configured to interact with client 302 and job tracker 304 so that it may query for at least the 'N' best paths in order of precedence. Then if the link that was chosen as the best RPF goes down the node can fall back to the next of the N best RPFs as provided by the Job Tracker.

The embodiments may also apply to network node that is an intermediate node and is being asked by a protocol independent multicast (PIM) neighbor downstream to select a reverse path for an S,G entry. The embodiments also apply to RP triggering an S,G join towards the first hop router.

In the example embodiments, data collection agent 310 running on the node 112 sends the set of data as configured by the network operator to the control entity 110 for client 302 to analyze and generate. Example implementations of the data set may include; a unicast routing information based (RIB) table (for analyzing multiple paths available from which the best one may be selected), node interface counters (for analyzing parameters like link health, link load, congestion on the link), system wide parameters like buffer utilization, average latency and resource utilization and/or indications of threshold events (for checking, for example, if any parameters have exceeded operator configured thresholds on any of the network nodes).

In example embodiments, reconfigurable software may be configured to include selected policies and considerations as inputs for the map-reduce algorithms. The map-reduce algorithms provide a dynamically optimized Many Tree multicast network having, for example, policy based traffic engineering for multicast networks, path selection based on latency requirements, path selection based on congestion and drop count, and path selection based on virtualization demands.

The embodiments also provide efficient and time saving solution for debugging and troubleshooting multicast topologies. In current ECMP based data center networks, it is difficult to predict and trace a multicast flow because of the exponential combination of paths that a packet can take based on the static hashing algorithm used for RPF path selection. In example embodiments, analysis of the data collected by the control entity 110 may provide the whole path that a flow will take (or is taking within a time period, for example, a few milliseconds). Such an analysis may also indicate which of the links that a packet is traversing has congestion or CRC drops or any other abnormality.

One or more embodiments may also provide the advantage in allowing operators to determine if they are utilizing their network fully before considering an upgrade to higher link bandwidths thus protecting their investment in costly infrastructure.

In terms of the infrastructure of the present disclosure, nodes 112 and control entity 110, as well as any master node, slave node, host, or server are network elements (that are synonymous with 'apparatuses' and 'nodes') that can facilitate the network communication activities discussed herein. As used herein in this Specification, the term 'network element' is a broad term meant to encompass routers, switches, cable boxes, gateways, bridges, loadbalancers, cellular and WiMAX access concentrators, firewalls, inline service nodes, data monitoring center, proxies, servers, processors, modules, endpoints, user equipment, handheld devices of any kind, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, any one or more of nodes 112 and control entity 110 include software to achieve (or to foster) the network communication activities discussed herein. This could include, for example, the implementation of instances of data collection agent 310, data query agent 312, job tracker 304, etc., as shown in FIG. 3, where these modules interact, perform reciprocating functions, and/or suitably coordinate their activities with peers across the network.

For example, instances of data collection agent 310, data query agent 312, and/or job tracker 304 may be provisioned in a node, a host, in a server, etc. Additionally, each of these elements can have an internal structure (e.g., a processor, a memory element, etc.) to facilitate any of the operations described herein. In other embodiments, these network communication activities may be executed externally to these elements, or included in some other network element to achieve the intended functionality. Alternatively, any of the aforementioned network elements may include software (or reciprocating software) that can coordinate with other network elements in order to achieve the network communication activities described herein. In still other embodiments, one or several devices (e.g., servers) may include any suitable algorithms, hardware, software, components, modules, interfaces, or objects that facilitate the operations discussed herein with respect to multicast management, Many Tree activities, etc.

Furthermore, the network element embodiments may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These nodes may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication network 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

Although the present disclosure has been described in detail with reference to particular arrangements and configurations, these example configurations and arrangements may be changed significantly without departing from the scope of the present disclosure. Moreover, although communication network 100 has been illustrated with reference to particular elements and operations that facilitate the communication process, these elements, and operations may be replaced by any suitable architecture or process that achieves the intended functionality of communication network 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   sending link data from a node to a control entity;
   querying the control entity for a Many Tree assignment;
   receiving, at the node, the Many Tree assignment from the control entity, wherein the Many Tree assignment comprises a plurality of reverse path forwarding assignments each having a priority relative to one another; and
   joining a Many Tree based on the Many Tree assignment.

2. The method of claim 1, wherein the Many Tree comprises a second tree, and the method further comprises creating a source group route with reverse path forwarding for a first tree on the node prior to the querying for the Many Tree assignment.

3. The method of claim 1, wherein the node comprises a last hop router on a first tree.

4. The method of claim 1, wherein the node comprises an intermediate node queried by a downstream node to select a reverse path for source group entry.

5. The method of claim 1, wherein the querying for the Many Tree assignment is triggered by a source group join towards a first hop router.

6. The method of claim 1, wherein the joining comprises:
   determining that a join-prune timer has expired; and
   joining a tree based on the Many Tree assignment.

7. The method of claim 1, wherein:
   the control entity is to, as part of determination of the Many Tree assignment, utilize a map-reduce algorithm on the data analysis set; and
   the map-reduce algorithm includes a map function that processes a key/value pair to generate a set of intermediate key/value pairs, and a reduce function that merges the intermediate values associated with the same intermediate key.

8. A method, comprising:
   receiving link data from a plurality of nodes and generating a data analysis set from the link data;
   receiving a query for a Many Tree assignment from a selected node of the plurality of nodes;
   determining a Many Tree assignment for the selected node based on the data analysis set wherein the determining comprises running a map-reduce algorithm on the data analysis set, and wherein the map-reduce algorithm includes a map function that processes a key/value pair to generate a set of intermediate key/value pairs, and a reduce function that merges the intermediate values associated with the same intermediate key; and
   sending the Many Tree assignment to the selected node.

9. The method of claim 8, wherein the selected node comprises a second node and the method further comprises:
   determining a heartbeat failure with a first node of the plurality of nodes; and
   removing data of the first node from the data analysis set.

10. The method of claim 8, wherein the determining comprises determining a reverse path forwarding assignment for the selected node based on the data analysis set.

11. The method of claim 8, wherein the Many Tree assignment comprises a plurality of reverse path forwarding assignments each having a priority relative to one another.

12. A node, comprising:
    one or more processors configured to cause the node to:
    send link data to a control entity;
    query the control entity for a Many Tree assignment;
    receive the Many Tree assignment from the control entity, wherein the Many Tree assignment comprises a plurality of reverse path forwarding assignments each having a priority relative to one another; and
    join a tree based on the Many Tree assignment.

13. The node of claim 12, wherein the one or more processors are further configured to cause the node to join a shortest path tree by creating a source group route with reverse path forwarding for the shortest path tree on the node prior to the query for a Many Tree assignment.

14. The node of claim 12, wherein the one or more processors are further configured to cause the node to join a shared path tree by creating a source group route with reverse path forwarding for the shared path tree on the node prior to the query for a Many Tree assignment.

15. The node of claim 12, wherein the node is a selected node of a plurality of nodes, the one or more processors are further configured to cause the node to communicate with a control entity coupled to the plurality of nodes, and the control entity is configured to:
    receive link data from each of the plurality of nodes and generate a data analysis set;
    receive a query for a Many Tree assignment from the selected node;
    determine a Many Tree assignment for the selected node based on the data analysis set; and
    send the Many Tree assignment to the selected node.

16. The node of claim 15, wherein:
    the control entity is to, as part of determination of the Many Tree assignment, utilize a map-reduce algorithm on the data analysis set; and
    the map-reduce algorithm includes a map function that processes a key/value pair to generate a set of intermediate key/value pairs, and a reduce function that merges the intermediate values associated with the same intermediate key.

17. One or more non-transitory media that includes instructions thereon that, in response to execution by one or more processors of a computing device, cause the computing device to:
    send link data from the computing device to a control entity;
    query the control entity for a Many Tree assignment;
    receive the Many Tree assignment from the control entity, wherein the Many Tree assignment comprises a plurality of reverse path forwarding assignments each having a priority relative to one another; and join a Many Tree based on the Many Tree assignment.

18. The one or more non-transitory media of claim 17, wherein the Many Tree comprises a second tree, and the instructions are further to, in response to execution by the one or more processors, cause the computing device to:

create a source group route with reverse path forwarding for a first tree on the node prior to the querying for the Many Tree assignment.

19. The one or more non-transitory media of claim 17, wherein:

the control entity is to, as part of determination of the Many Tree assignment, utilize a map-reduce algorithm on the data analysis set; and the map-reduce algorithm includes a map function that processes a key/value pair to generate a set of intermediate key/value pairs, and a reduce function that merges the intermediate values associated with the same intermediate key.

20. The one or more non-transitory media of claim 17, wherein the Many Tree assignment includes an indication of a multicast tree routed through plurality of possible paths in a network, wherein a set of the possible paths is larger than a set of possible paths based only on shortest path (SPT) criteria or shared tree path (RPT) criteria.

* * * * *